US012655028B2

(12) United States Patent
Park et al.

(10) Patent No.: US 12,655,028 B2
(45) Date of Patent: Jun. 16, 2026

(54) MXENE ELECTRODE FOR ELECTRONIC DEVICES HAVING EXCELLENT OXIDATION STABILITY AND FLEXIBILITY AND METHOD OF MANUFACTURING THE SAME ELECTRODE

(71) Applicant: UIF (University Industry Foundation), Yonsei University, Seoul (KR)

(72) Inventors: Cheolmin Park, Seoul (KR); Seokyeong Lee, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 658 days.

(21) Appl. No.: 18/058,826

(22) Filed: Mar. 3, 2023

(65) Prior Publication Data

US 2023/0234853 A1 Jul. 27, 2023

(51) Int. Cl.
C01B 32/921 (2017.01)
H01B 1/02 (2006.01)
H01B 1/04 (2006.01)

(52) U.S. Cl.
CPC ............. C01B 32/921 (2017.08); H01B 1/02 (2013.01); H01B 1/04 (2013.01); *C01P 2002/72* (2013.01); *C01P 2002/82* (2013.01); *C01P 2004/03* (2013.01); *C01P 2004/04* (2013.01); *C01P 2004/24* (2013.01); *C01P 2004/61* (2013.01); *C01P 2006/40* (2013.01)

(58) Field of Classification Search
None
See application file for complete search history.

(56) References Cited

U.S. PATENT DOCUMENTS

2020/0220163 A1* 7/2020 Li ........................ H01M 4/0404
2021/0382365 A1 12/2021 Gogotsi et al.

FOREIGN PATENT DOCUMENTS

| KR | 10-2020-0052597 A | 5/2020 | |
| KR | 20200052597 A * | 5/2020 | ............. H01G 11/48 |
| KR | 10-2020-0083378 A | 7/2020 | |
| KR | 10-2021-0112136 A | 9/2021 | |

OTHER PUBLICATIONS

Park et al., KR 20200052597, May 15, 2020 (machine translation) (Year: 2020).*
Lee et al., "Polymer-Laminated Ti3C2TX MXene Electrodes for Transparent and Flexible Field-Driven Electronics", ACS Nano 2021, 15, 8940-8952.

* cited by examiner

*Primary Examiner* — Cheng Yuan Huang
(74) *Attorney, Agent, or Firm* — ROTHWELL, FIGG, ERNST & MANBECK, P.C.

(57) ABSTRACT
The present invention relates to a MXene electrode for electronic products having excellent oxidation stability and flexibility and a method for manufacturing the same, and more specifically to a MXene electrode which has excellent stability from changes such as oxidation in a driving environment, excellent transparency and mechanical properties and high electrical conductivity such that it is appropriate to be used as a transparent electrode in electronic devices, and a method for manufacturing the same.

7 Claims, 12 Drawing Sheets

[FIG. 1a]
a
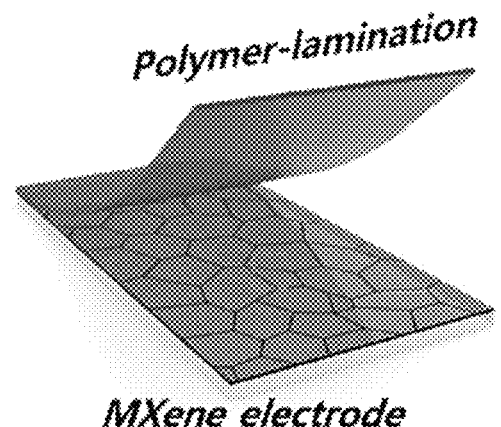

[FIG. 1b]
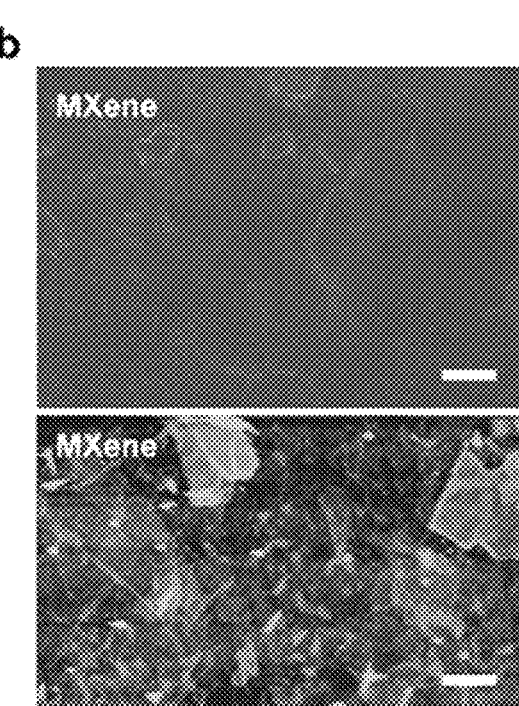

[FIG. 1c]
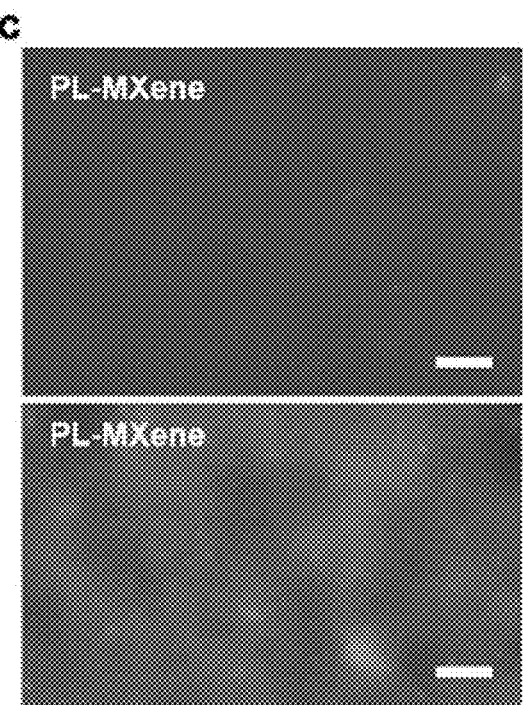

[FIG. 1d]
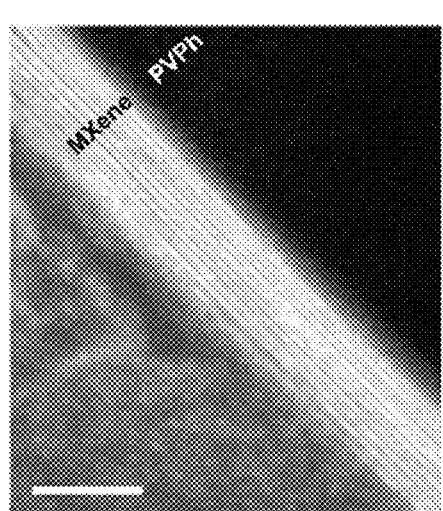

[FIG. 2a]
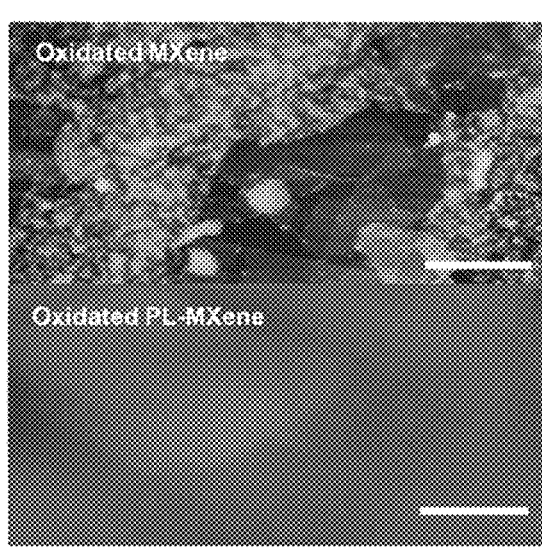

【FIG. 2b】
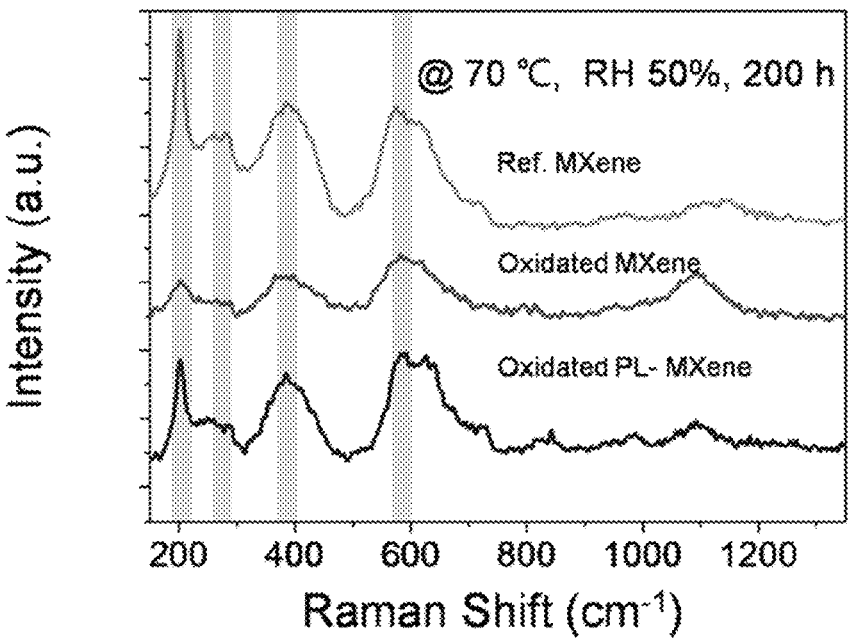

【FIG. 2c】
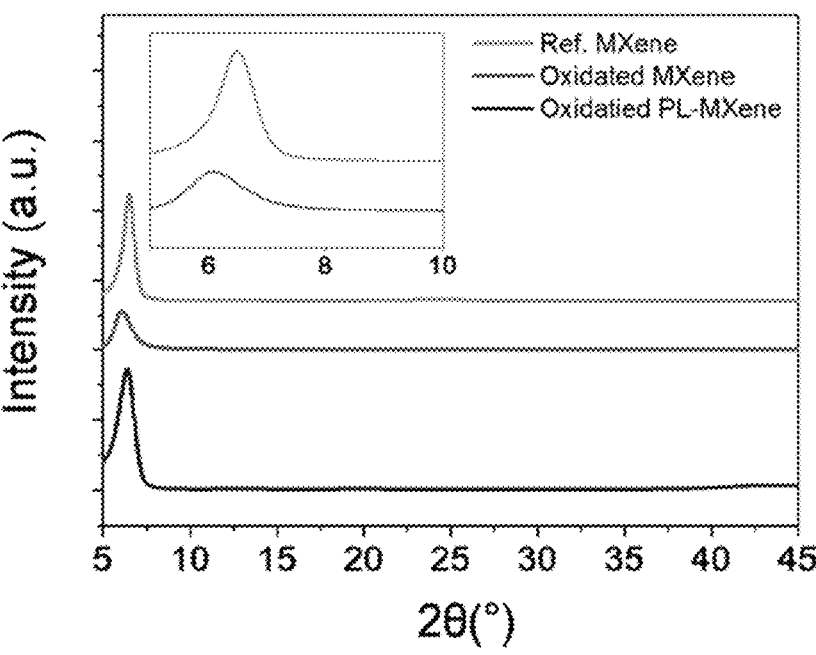

【FIG. 3】
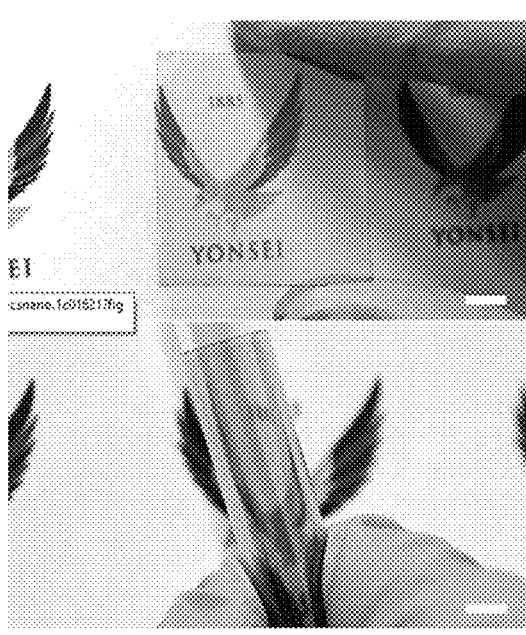

[FIG. 4a]
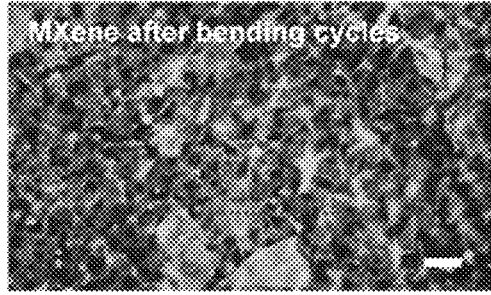

【FIG. 4b】
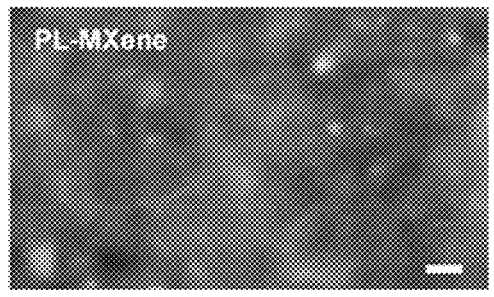 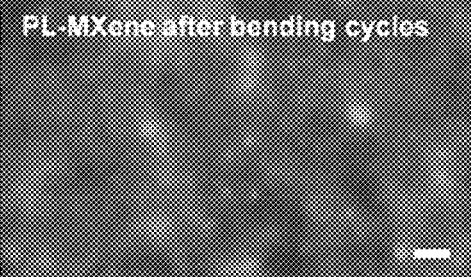

【FIG. 5】
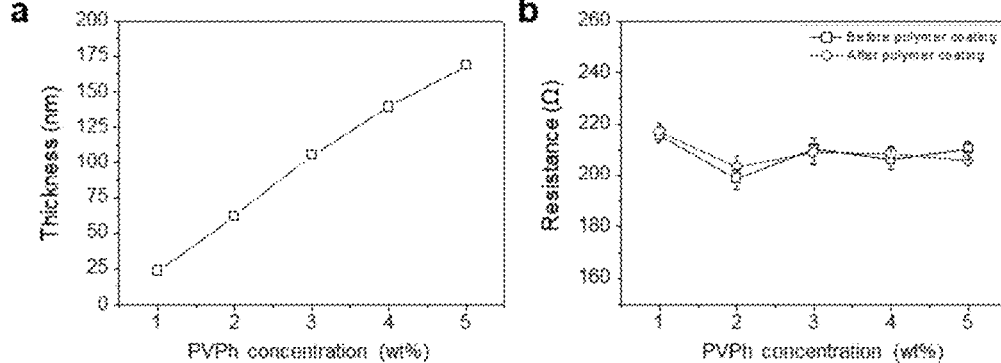

【FIG. 6】
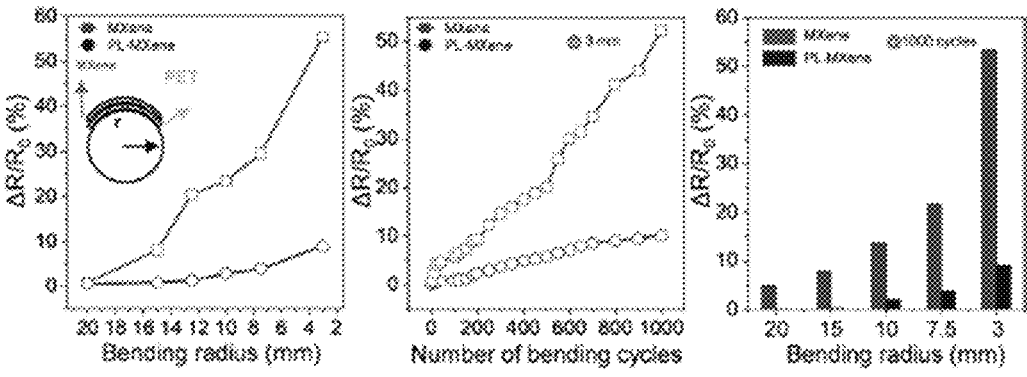

MXENE ELECTRODE FOR ELECTRONIC DEVICES HAVING EXCELLENT OXIDATION STABILITY AND FLEXIBILITY AND METHOD OF MANUFACTURING THE SAME ELECTRODE

STATEMENT REGARDING PRIOR DISCLOSURES BY THE INVENTOR OR A JOINT INVENTOR

Applicant designates the following article as a grace period publication in order to expedite examination of the application in accordance with 37 CFR 1.77(b)(6) and MPEP 608.01(a): "Polymer-Laminated $Ti_3C_2T_X$ MXene Electrodes for Transparent and Flexible Field-Driven Electronics" published in ACS Nano in 2021. The disclosures of the article are incorporated herein by reference in their entirety for all purposes.

CROSS-REFERENCE TO RELATED APPLICATION

This application claims priority to and the benefit of Korean Patent Application No. 10-2021-0164073, filed on Nov. 25, 2021, the disclosure of which is incorporated herein by reference in its entirety.

TECHNICAL FIELD

The present invention relates to a MXene electrode for electronic products having excellent oxidation stability and flexibility and a method for manufacturing the same, and more specifically to a MXene electrode which has excellent stability from changes such as oxidation in a driving environment, excellent transparency and mechanical properties and high electrical conductivity such that it is appropriate to be used as a transparent electrode in electronic devices, and a method for manufacturing the same.

BACKGROUND

An emerging challenge in electronic devices with good transparency and flexibility for use in sensors, displays, light harvesting devices, switches and the like is to develop a transparent electrode that can be manufactured by a solution process while having a sufficiently high conductivity compared to ITO (which has a hard property).

Carbon nanotubes, reduced graphene oxide, silver (Ag) nanowires, transparent conductive polymers and the like have been studied as nanoscale electrode materials capable of such a solution process, but these have limitations in conductivity or film quality.

MXene film is known to have high conductivity and mechanical properties suitable for use in organic light emitting diodes, but it also has a low environmental stability problem such as oxidation in a driving environment. Therefore, the situation is that it is necessary to develop a method to solve these problems.

(Patent Document 0001) US 2021/0382365 A1 (Dec. 9, 2021)

SUMMARY OF THE INVENTION

The present invention has been devised to solve the above-described technical problems, and the problems to be solved by the present invention are directed to providing a MXene electrode for electronic products having excellent stability against oxidation in a driving environment, and high transparency and mechanical flexibility, and a method for manufacturing the same.

In order to solve the above-described technical problems, the present invention provides a MXene electrode having excellent oxidation stability and flexibility, including a MXene electrode layer including MXene flakes in which two or more layers of an elemental titanium layer and an elemental carbon layer are alternately laminated; and a polymer protective layer which is formed on at least one surface of the MXene electrode layer to shield the MXene electrode layer from the outside, wherein the elemental titanium layer and the elemental carbon layer respectively have at least one terminal group selected from —OH, —O and —F on a surface thereof.

In a preferred exemplary embodiment of the present invention, the MXene flakes may have an average planar-direction size of 1.3 μm to 1.8 μm.

In a preferred exemplary embodiment of the present invention, the polymer protective layer may be formed to a thickness of 30 nm to 100 nm.

In a preferred exemplary embodiment of the present invention, the MXene electrode having excellent oxidation stability and flexibility may have a difference in electrical resistance of 10% or less compared to a case where only the MXene electrode exists without a polymer protective layer.

In a preferred exemplary embodiment of the present invention, the MXene electrode having excellent oxidation stability and flexibility may have a $\Delta R/R_0$ value of 40% or less, which is the ratio of a change in electrical resistance $(\Delta R)$ when exposed to the air for 200 hours compared to the initial electrical resistance $(R_0)$.

In a preferred exemplary embodiment of the present invention, the polymer protective layer may be a polymer layer including at least one polymer selected from polyvinylphenol (PVPh), poly(vinylidene fluoride-co-trifluoroethylene) (P(VDF-TrFE)), polyvinylpyrrolidone (PVPy), polymethyl methacrylate (PMMA) and poly(vinylidene fluoride-co-trifluoroethylene-co-chlorofluoroethylene).

Further, in order to solve the above-described technical problems, the present invention provides a method for manufacturing a MXene electrode having excellent oxidation stability and flexibility, including the steps of 1) forming a MXene electrode layer by coating and curing a MXene flake solution comprising MXene flakes which are uniformly dispersed in a solvent on a substrate; and 2) forming a polymer protective layer by applying and curing a polymer solution on the MXene electrode layer.

In a preferred exemplary embodiment of the present invention, the solvent may be water.

In a preferred exemplary embodiment of the present invention, the MXene flakes may be a laminate in which two or more layers of an elemental titanium layer and an elemental carbon layer are alternately laminated, and the elemental titanium layer and the elemental carbon layer may respectively have at least one terminal group selected from —OH, —O and —F on a surface thereof.

The MXene electrode according to the present invention has excellent stability against oxidation in a driving environment due to the polymer protective layer, and nevertheless, the electrical conductivity does not significantly decrease, and the transparency and flexibility in the bending test are excellent such that it has the advantage of being a response to the demand for flexible, electrically stable and highly stable transparent electrodes against mechanical deformation, which are required in various electronic devices such as light emitting devices, pressure sensors and energy harvesting devices, wearable devices and the like.

BRIEF DESCRIPTION OF THE DRAWINGS

FIG. 1a is a diagram schematically showing the structure of a MXene electrode according to a preferred exemplary embodiment of the present invention.

FIG. 1b is a set of images obtained by photographing the surface of a MXene electrode taken by SEM (top) and AFM (bottom).

FIG. 1c is a set of images showing that the surface of the polymer protective layer formed on the surface of the MXene electrode was photographed by SEM (top) and AFM (bottom).

FIG. 1d is an image obtained by photographing the cross-section of the layered structure of a MXene electrode, in which a polymer protective layer is laminated, by TEM.

FIG. 2a is a set of images obtained by photographing the appearance when the MXene electrode (top) and the MXene electrode formed with a polymer protective layer (bottom) are oxidized, respectively, by AFM.

FIG. 2b is a graph comparing the Raman spectra of an oxidized MXene electrode at a temperature of 70° C. and a relative humidity of 50%, a MXene electrode before oxidation and a MXene electrode having an oxidized polymer protective layer.

FIG. 2c is a graph comparing the XRD spectra of an oxidized MXene electrode at a temperature of 70° C. and a relative humidity of 50%, a MXene electrode before oxidation and a MXene electrode having an oxidized polymer protective layer.

FIG. 3 is a set of images obtained by photographing a state in which the MXene electrode, in which a polymer protective layer formed on a flexible PET substrate is laminated, is tested for flexibility.

FIG. 4a is a set of images obtained by photographing and comparing the appearance before and after performing a bending test for the MXene electrode film formed on a flexible PET substrate for more than 1,000 times by AFM.

FIG. 4b is a set of images obtained by photographing and comparing the appearance before and after performing a bending test for the MXene-polymer protective layer electrode film formed on a flexible PET substrate for more than 1,000 times by AFM.

FIG. 5 comparatively illustrates the characteristics of the MXene electrode according to the characteristics of the polymer protective layer according to a preferred exemplary embodiment of the present invention, wherein a is a comparative illustration of the thickness of the PVPh protective layer according to the PVPh concentration in the PVPh solution, and b is a graph illustrating the comparison of the magnitude of the MXene electrode resistance before and after forming the polymer protective layer according to the difference in concentration.

FIG. 6 is a comparison of the difference in physical properties between MXene electrodes formed with a polymer protective layer according to a preferred exemplary embodiment of the present invention and exposed MXene electrodes without a protective layer, wherein it is a set of graphs comparatively illustrating a change in resistance according to a difference in bending radius (left), a change in resistance values according to the number of bendings (middle) and a change in resistance value according to the bending radius (right side) when bending was repeated 1,000 times.

DETAILED DESCRIPTION

Prior to the detailed description of the specific configuration and effects of the present invention, the meaning of the terms used in the present specification is clearly defined.

As used herein, the term "MXene" means a two-dimensional inorganic compound. Accordingly, it has the shape of a flake with a thickness of only one to several atoms, and examples thereof include compounds such as carbides and nitrides of transition metals, and there are also compounds such as graphene or hexagonal boron nitrides.

As used herein, the term "flake" refers to an object in the form of a thin film.

Hereinafter, specific configurations and effects of the present invention will be described in more detail.

As described above, carbon nanotubes, reduced graphene oxide, silver nanowires and conductive polymers with transparency, which have been developed as electrode materials with excellent transparency and flexibility that can be manufactured by conventional solution processes, have limitations in electrical conductivity and film quality. In addition, MXene films have been developed as materials having high conductivity and excellent mechanical properties (flexibility, etc.) for next-generation organic light emitting diodes, but have low environmental stability.

The inventors of the present invention have reached the present invention as a result of intensive research in order to solve the technical problems of the problem of materials for solving the demand in the technical field. The present invention provides a MXene electrode having excellent oxidation stability and flexibility, including a MXene electrode layer including MXene flakes in which two or more layers of an elemental titanium layer and an elemental carbon layer are alternately laminated; and a polymer protective layer which is formed on at least one surface of the MXene electrode layer to shield the MXene electrode layer from the outside, wherein the elemental titanium layer and the elemental carbon layer respectively have at least one terminal group selected from —OH, —O and —F on a surface thereof.

The elemental titanium layer and the carbon layer provide a MXene electrode having excellent oxidation stability and flexibility, which is characterized in that they respectively have at least one terminal group selected from —OH, —O and —F on a surface thereof.

By providing such a configuration, the present invention can utilize the excellent electrical conductivity and mechanical properties of MXene electrodes, but also compensate for the stability in a driving environment, which is a disadvantage thereof, and in the process, the original MXene electrode's optical, electrical or mechanical properties are not significantly deteriorated such that it can operate stably in the driving environment of various electronic devices.

The MXene flakes may preferably be titanium carbide $(Ti_3C_2)$. Specifically, the titanium carbide having a two-dimensional crystal structure has at least one terminal group selected from —OH, —O and —F.

In a preferred exemplary embodiment of the present invention, the MXene flakes may have an average planar-direction size of 1.3 μm to 1.8 μm. Herein, the average planar-direction size of a μm is used to mean that the area of flakes is equal to the area of a circle with a diameter of a μm. If the average planar-direction size of the MXene flakes is less than 1.3 μm, the anisotropy of the entire MXene electrode may be lowered such that the electrical conductivity thereof is reduced, and if it is more than 1.8 μm, the thickness uniformity of the MXene electrode is lowered such that there is a possibility that the quality of the final MXene electrode may deteriorate.

In a preferred exemplary embodiment of the present invention, the polymer protective layer may be formed to a thickness of 30 nm to 100 nm. If the thickness of the polymer protective layer is less than 30 nm, the oxidation preventing effect of the MXene electrode may not be sufficient, and conversely, if the thickness is more than 100 nm, the electrical conductivity is reduced by the polymer such that there is a concern that it is not suitable for use as an electrode.

In a preferred exemplary embodiment of the present invention, the MXene electrode having excellent oxidation stability and flexibility may have a difference in electrical resistance of 10% or less compared to a case where only the MXene electrode exists without a polymer protective layer. More preferably, the difference in electrical resistance value may be 5% or less. In this way, despite the formation of the polymer protective layer, the difference in electrical resistance is not large such that the MXene electrode according to the present invention can exhibit excellent electrical characteristics despite having significantly improved oxidation stability.

In a preferred exemplary embodiment of the present invention, the MXene electrode having excellent oxidation stability and flexibility has a $\Delta R/R_0$ value of 40% or less, which is the ratio of a change in electrical resistance ($\Delta R$) when exposed to the air for 200 hours compared to the initial electrical resistance ($R_0$). In addition, a $\Delta R/R_0$ value when bending tests are performed 1,000 times with a curvature radius of 3 mm may be 10 or less. The MXene electrode according to the present invention has such excellent flexibility, thereby exhibiting excellent electrical properties and transparent optical properties, while significantly improving oxidation stability such that properties can be stably exhibited.

In addition, the MXene electrode according to the present invention exhibits very high resistance value stability even when humidity and temperature are varied. That is, it has excellent resistance to oxidation. FIGS. 2b and 2c are graphs which comparatively illustrate the Raman and XRD spectra of MXene electrodes exposed to 200 hours at a temperature of 70° C. and a relative humidity of 50% and MXene electrodes formed with an oxidized polymer protective layer with MXene electrodes before oxidation. Referring to FIGS. 2b and 2c, it can be seen that the MXene electrode with a polymer protective layer (PL) was oxidized and the peak was dulled compared to the MXene electrode without a protective layer, but it can be confirmed that the MXene electrode with a polymer protective layer had a lower degree of oxidation, and there was no significant difference in the shape of the MXene electrode and the peak before oxidation. That is, it can be seen that the MXene electrode according to the present invention has excellent stability in a high-temperature and high-humidity environment.

In a preferred exemplary embodiment of the present invention, the polymer protective layer may be a polymer layer including at least one polymer selected from polyvinylphenol (PVPh), poly(vinylidene fluoride-co-trifluoroethylene) (P(VDF-TrFE)), polyvinylpyrrolidone (PVPy), polymethyl methacrylate (PMMA) and poly(vinylidene fluoride-co-trifluoroethylene-co-chlorofluoroethylene). Preferably, it may be a polyvinylphenol polymer layer. Polyvinylphenol may form a uniform surface, may perform the function of preventing oxidation for MXene electrodes due to one characteristic, and also may have a low surface roughness after forming a protective layer so as to be suitable to exhibit transparency.

In a preferred exemplary embodiment of the present invention, the MXene electrode may have a surface roughness of 2.0 nm or less when measured by root-mean-square (RMS) after the polymer protective layer is formed. If the surface roughness is more than 2.0 nm, transparency may be deteriorated and electrical properties may also be deteriorated, and thus, it is preferable that the surface roughness (roughness) is limited within the above range.

Further, in order to solve the above-described technical problems, the present invention provides a method for manufacturing a MXene electrode having excellent oxidation stability and flexibility, including the steps of 1) forming a MXene electrode layer by coating and curing a MXene flake solution comprising MXene flakes which are uniformly dispersed in a solvent on a substrate; and 2) forming a polymer protective layer by applying and curing a polymer solution on the MXene electrode layer.

In a preferred exemplary embodiment of the present invention, the solvent may be water.

In a preferred exemplary embodiment of the present invention, the MXene flake is a laminate in which two or more layers of an elemental titanium layer and an elemental carbon layer are alternately laminated, and the elemental titanium layer and the elemental carbon layer may respectively have one terminal group selected from —OH, —O and —F on a surface thereof.

In addition, the polymer solution may preferably include a polymer in an amount of 1 wt. % to 10 wt. %. If the content of the polymer included in the polymer solution is less than 1 wt. %, the thickness of the formed polymer protective layer is too thin such that the oxidation protection effect on the MXene electrode may not be evident. In addition, if it is more than 10 wt. %, since the formed polymer protective layer becomes too thick, there is a problem in that flexibility is reduced and electrical characteristics may be deteriorated. More preferably, it may be included in an amount of 3 wt. % to 7 wt. %.

Hereinafter, specific examples will be described in more detail with respect to the configuration and effects of the present invention. The following examples are intended to illustrate the exemplary embodiments of the present invention for easy understanding, but do not limit the scope of present invention. However, those skilled in the art will be able to implement the invention pertaining to the technical spirit of the present invention by adding, replacing or deleting non-essential components other than the essential components described in the claims of the present invention.

EXAMPLE

Example 1: Manufacture of MXene Electrode Formed with Polymer Protective Layer 1) Preparation of MXene Solution A $Ti_3C_2$ MXene solution was prepared by using selective chemical etching using $Ti_3AlC_2$ MAX powder (particle size of about 40 μm) purchased from Carbon-Ukraine Ltd. of Ukraine. That is, 3 g of $Ti_3AlC_2$ powder was reacted with an etching solution, in which 4.8 g of LiF and 60 mL of 9M HCl solution were mixed, at 35° C. for 24 hours.

It was spun in a centrifuge at 3,500 rpm for 5 minutes until the supernatant including dark green $Ti_3C_2$ flakes floated stably. $Ti_3C_2T_x$, which was exfoliated in flakes that settled to a viscous precipitate, was shaken by hand to obtain a dispersed dispersion.

2) Formation of Polymer Protective Layer

A MXene electrode was formed by spin-coating the MXene dispersion on a substrate, and it was cured by annealing at 200° C. for 2 hours under a N₂ atmosphere.

Herein, an aqueous solution including poly(4-vinylphenol) (PVPh) in an amount of 1 wt % was spin-coated again. After curing by annealing at 150° C. for 30 minutes, PEDOT: PSS including 0.5 wt. % of Zonyl surfactant was spin-coated at 2,000 rpm for 60 seconds on the surface of the MXene electrode on which the polymer protective layer was formed, followed by annealing at 140° C. for 10 minutes in a N₂ gas atmosphere. Zonyl surfactant was formed to improve the wettability of the PEDOT:PSS layer in the MXene electrode layer formed with the polymer protective layer.

A super yellow light-emitting film was formed thereon by spin-coating a solution (0.5 wt. %) mixed with MWNTs dispersed in toluene at 1,000 rpm for 60 seconds.

The surface of the thus-formed laminate was loaded into a high-vacuum thermal evaporator, and a LiF (1 nm)/Al (75 nm) upper electrode was deposited through a shadow mask at deposition rates of 0.1 and 1.0 Å/s, respectively.

Example 2: Manufacture of MXene Electrode Formed with Polymer Protective Layer A MXene electrode formed with a polymer protective layer was manufactured in the same manner as in Example 1, except that the PVPh solution was used at a concentration of 2 wt. %.

Example 3: Manufacture of MXene Electrode Formed with Polymer Protective Layer A MXene electrode formed with a polymer protective layer was manufactured in the same manner as in Example 1, except that the PVPh solution was used at a concentration of 3 wt. %.

Example 4: Manufacture of MXene Electrode Formed with Polymer Protective Layer A MXene electrode formed with a polymer protective layer was manufactured in the same manner as in Example 1, except that the PVPh solution was used at a concentration of 4 wt. %.

Example 5: Manufacture of MXene Electrode Formed with Polymer Protective Layer A MXene electrode formed with a polymer protective layer was manufactured in the same manner as in Example 1, except that the PVPh solution was used at a concentration of 5 wt. %.

Comparative Example 1: Manufacture of Exposed MXene Electrode

It was carried out in the same manner as in Example 1, except that a polymer protective layer was not formed.

Experimental Example 1: Comparison Experiment of Electrical Resistance with Comparative Example The electrical resistance values of the MXene electrodes according to Comparative Example 1 and the MXene electrodes according to Examples 1 to 5 were measured by using a sheet resistor and a multimeter and compared with each other. The results are shown in FIG. 5. The reason why the values of the comparative example are different is that each sample had errors, and each comparative example sample was compared with the electrical resistance values of MXene electrodes which were completed by treating with a polymer protective layer as shown in the examples.

When the results were confirmed, as a result of applying a solution including a polymer protective layer in an amount of 1 to 5 wt. %, it can be seen that the excellent electrical conductivity of the MXene electrode did not change significantly, and thus, it appeared that the original electrical properties can still be advantageously used.

Experimental Example 2: Flexibility Test

1) Comparison of Resistance Change Due to Bending that Varies According to the Radius of Curvature The electrical resistance of the MXene electrodes according to Example 2 and the comparative example was measured and compared with those of the bent and unbent electrodes with different radii of curvature, respectively. The results are illustrated in the left graph of FIG. 6. Referring to the drawing, it can be seen that the MXene electrode (PL-MXene) according to Example 2 on which the polymer protective layer was formed did not have increased resistance values even if the bending radius of curvature decreased, which indicates that the electrical characteristics were maintained excellently.

2) Comparison of Resistance Changes According to the Number of Repetitions in Bending Test with the Radius of Curvature of 3 mm A 3 mm bending test was performed on the MXene electrodes according to Example 2 and the comparative example, and the changes in resistance value were compared while increasing the number of repetitions. The results are illustrated in the middle graph of FIG. 6. Referring to the drawing, it can be seen that the increase in the resistance values of the MXene electrode (PL-MXene) according to Example 2 as the number of repetitions of bending was increased was smaller than that of the comparative example without the protective layer.

3) Comparison of Resistance Change According to Bending Radius at 1,000 Bending Repetitions The bending test was repeated 1,000 times with the MXene electrodes according to Example 2 and the comparative example by changing the radii of curvature, and the changes in electrical resistance before and after the bending test were measured and compared. The results are illustrated in the right graph of FIG. 6. Referring to the drawing, it can be seen that the increase in resistance value increased as the bending radius of curvature decreased in all of the examples and comparative example, but it was found that the increase in resistance value in the comparative example was significantly greater. Therefore, it can be seen that the MXene electrode according to a preferred exemplary embodiment of the present invention may implement strong oxidation resistance to the external environment and stable electrical characteristics due to the polymer protective layer.

The invention claimed is:

1. A MXene electrode having oxidation stability and flexibility, comprising:
   a MXene electrode layer comprising MXene flakes in which two or more layers of an elemental titanium layer and an elemental carbon layer are alternately laminated; and a polymer protective layer on at least one surface of the MXene electrode layer to shield the MXene electrode layer from the outside, wherein the elemental titanium layer and the elemental carbon layer respectively have at least one terminal group selected from —OH, —O and —F on a surface thereof, wherein the polymer protective layer has a thickness of 30 nm to 100 nm, and wherein the polymer protective layer is a polymer layer comprising polyvinylphenol (PVPh).

2. The MXene electrode of claim 1, wherein the MXene flakes have an average planar-direction size of 1.3 µm to 1.8 µm.

3. The MXene electrode of claim 1, wherein the MXene electrode has a difference in electrical resistance of 10% or less compared to the MXene electrode without a polymer protective layer.

4. The MXene electrode of claim 1, wherein the MXene electrode has a $\Delta R/R_0$ value of 40% or less, which is a ratio of a change in electrical resistance ($\Delta R$) when exposed to air for 200 hours compared to initial electrical resistance ($R_0$).

5. A method for manufacturing the MXene electrode of claim 1, comprising the steps of:

1) forming the MXene electrode layer by coating and curing a MXene flake solution comprising MXene flakes which are uniformly dispersed in a solvent on a substrate; and 2) forming the polymer protective layer by applying and curing a polymer solution on the MXene electrode layer, wherein the polymer protective layer has the thickness of 30 nm to 100 nm, and wherein the polymer protective layer is the polymer layer comprising polyvinylphenol (PVPh).

6. The method of claim 5, wherein the solvent is water.

7. The method of claim 5, wherein the MXene flakes are a laminate in which two or more layers of the elemental titanium layer and the elemental carbon layer are alternately laminated.

* * * * *